(12) United States Patent
Makinen

(10) Patent No.: US 6,205,172 B1
(45) Date of Patent: Mar. 20, 2001

(54) FADE MARGIN MEASUREMENT IN A RADIO SYSTEM

(75) Inventor: Jarmo Makinen, Espoo (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/513,281

(22) Filed: Feb. 24, 2000

Related U.S. Application Data

(63) Continuation of application No. PCT/FI98/00680, filed on Aug. 31, 1998.

(30) Foreign Application Priority Data

Sep. 2, 1997 (FI) .......................................... 973582

(51) Int. Cl.$^7$ .............................. H04B 17/00; H04B 3/46; H04Q 1/20
(52) U.S. Cl. ......................... 375/227; 375/259; 375/317; 455/13.4
(58) Field of Search .................................... 375/224, 227, 375/259; 455/13.4

(56) References Cited

U.S. PATENT DOCUMENTS

| | | | |
|---|---|---|---|
| 5,307,379 | * 4/1994 | Bergstrom et al. | 375/317 |
| 5,924,015 | * 7/1999 | Garrison et al. | 455/13.4 |

FOREIGN PATENT DOCUMENTS 2107066  3/1994 (CA) .

* cited by examiner

*Primary Examiner*—Chi Pham
*Assistant Examiner*—Phuong Phu
(74) *Attorney, Agent, or Firm*—Altera Law Group, LLC

(57) ABSTRACT

The invention relates to a method for measuring the fade margin in a radio system. The system comprises at least one transmitter (11*a*; 11*b*) and at least one receiver (12*b*; 12*a*) which in an operational situation establish a fixed radio connection. In the method, the receiver is calibrated by supplying the receiver with an input signal at several different power levels and determining the correspondence between the supplied signal level and a quantity detected by the receiver. To enable the fade margin to be determined as simply as possible, (a) the calibration is carried out in such a way that at least one supplied power level is close to the noise level of the receiver, (b) in a situation where substantially mere noise is suued into the payload signal, a threshold value (PTH1) for the received signal level, corresponding to a predetermined bit error ratio, is determined for the receiver (c), in an operational situation of the radio system, the signal level arriving at the receiver is determined without payload signal, (d) on the basis of the calibration data and the level determined in step (c), that threshold value for the received signal level which corresponds to said predetermined bit error ratio in the operational situation of the radio system is determined, and (e) the fade margin is determined on the basis of the threshold value for the operational situation and the signal level measured in the operational situation of the system.

8 Claims, 3 Drawing Sheets

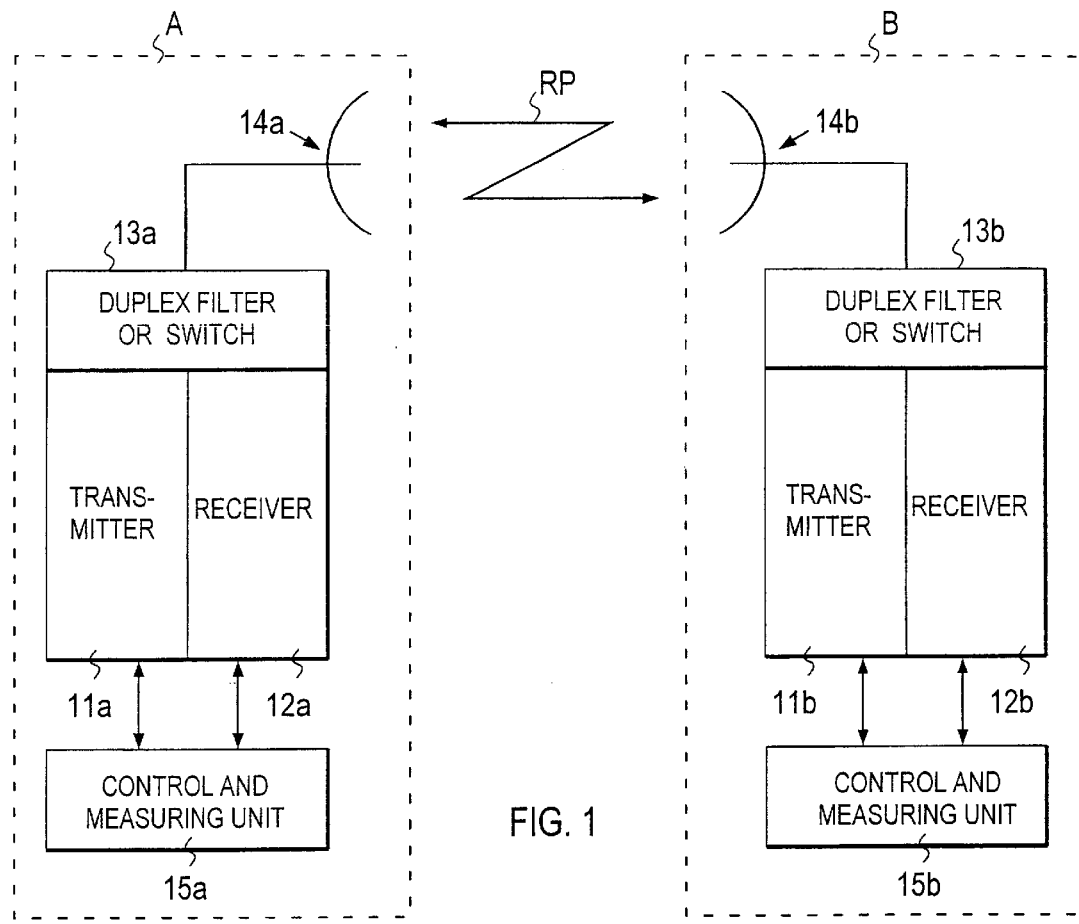
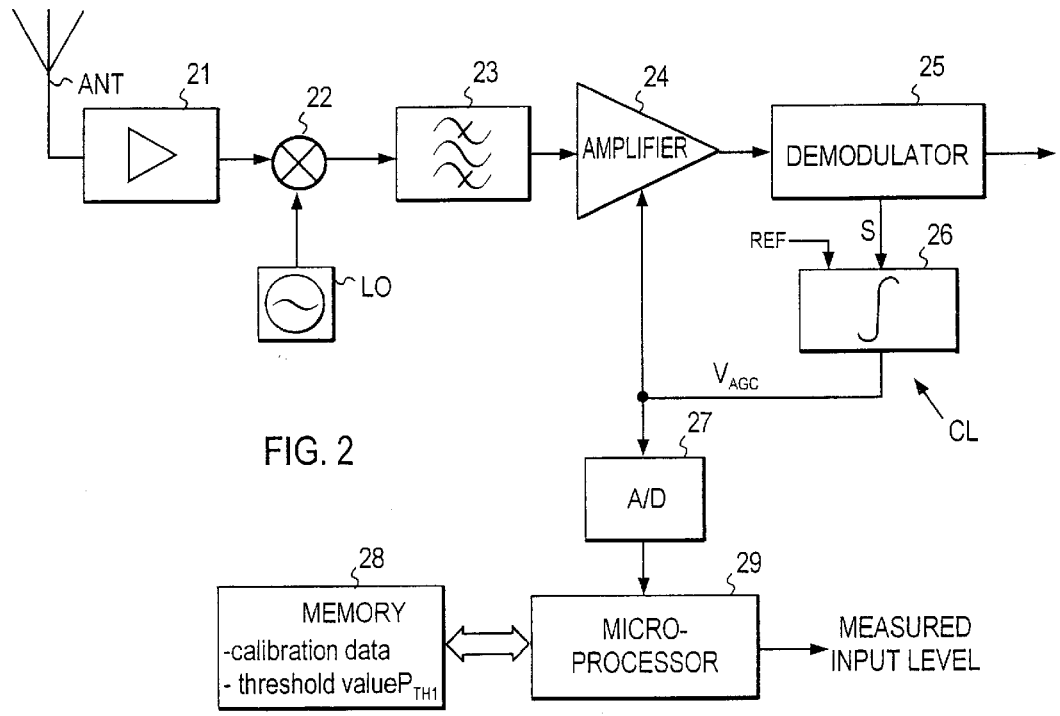
FIG. 1
FIG. 2

FADE MARGIN MEASUREMENT IN A RADIO SYSTEM

The application is a continuation of PCT/IF198/00680 filed Aug. 31, 1998.

FIELD OF THE INVENTION

The invention relates generally to a radio system. More specifically, the invention relates to fade margin measurement to be implemented in a radio system. A fade margin refers to how much a transmitted signal can be attenuated until the bit error ratio increases to a value which, upon being exceeded, results in the signal being deemed invalid for transmission. By means of the fade margin, the reliability of a radio connection can be estimated. Primary applications of the invention will be in radio link systems.

BACKGROUND ART OF THE INVENTION

In constructing fixed digital radio link connections, it is essential that the probability of the connection being broken remains sufficiently low. In addition to equipment reliability, this probability is dependent on phenomena in the radio path which affect the radio wave propagation. Such phenomena include:

1. normal free-space attenuation,
2. attenuation caused by rain, slowly changing in frequency and time,
3. splitting of the signal propagation path, on account of changes in the atmospheric refractive index or reflections caused by terrain obstructions, into two or more routes (multipath propagation) and frequency-selective attenuation caused by the interaction of said routes, and
4. interference arriving at the receiver from other radio link hops or other equipment.

A radio link hop is implemented in such a way that the fade margin for reception (that is, the ratio of the power of the desired signal to the sensitivity of the receiver in an operational situation in which interference is experienced) is sufficiently high. In such a situation, the probability that additional signal attenuation on account of phenomena 2 and 3 and deterioration of the reception sensitivity of the receiver on account of phenomenon 4 alone or in combination should be capable of cutting off the signal is sufficiently low. The signal is deemed as cut off when its bit error ratio exceeds a given limit value. This limit value is usually $10^{-3}$, which means a situation where every thousandth received bit, on an average, is erroneous. The limit value for the bit error ratio is termed the error ratio threshold and the corresponding input power value is termed the threshold power in the present context.

In conjunction with the commissioning of a radio link, the fade margin is usually checked under normal operational conditions. This check is conventionally made in such a way that the transmitter signal is attenuated until the bit error ratio of the receiver at the other end of the radio link hop deteriorates to the point of cut-off. The magnitude of attenuation gives directly the fade margin of the radio link hop. It should be noted that the fade margin cannot be directly calculated from the received signal power and the typical sensitivity of the receiver or the sensitivity measured in the manufacturing stage, as the effect of interference arriving at the receiver in an operational situation will then remain unobserved.

In the fade margin measurement carried out at the commissioning phase, attenuation of the transmission signal can be effected either in such a way that the transmission power of the actual transmitter can be adjusted or in such a way that a separate adjustable attenuator is connected after the transmitter for the time of measurement. The requisite attenuation is usually very high (30 . . . 50 dB), and the accuracy of it determines the accuracy of the measurement. Providing sufficiently accurate and wide-ranging power control in the actual transmitter will increase its cost and is very seldom economically feasible. On the other hand, using a separate attenuator is very cumbersome, especially when the radio parts of the radio link are located outdoors on an antenna mast.

Neither can such measurement be carried out by remote control, and hence the measurement must be carried out anew on site when it is suspected that the conditions have changed from those prevalent at the commissioning phase of the link.

SUMMARY OF THE INVENTION

The purpose of the present invention is to eliminate the drawbacks described above and to provide a solution allowing the fade margin of a radio link, such as a link hop, to be measured by remote control with sufficient accuracy and using as simple equipment as possible.

This objective is achieved with a solution as defined in the independent claims.

The idea of the invention is to measure the level of the incoming signal (which contains interference from the antenna and noise internal to the equipment) in an operational situation of the radio system without a payload signal, and on the basis thereof to determine computationally the change in the threshold power without interference in relation to the rated threshold power (specified in the production stage or in servicing). On the basis of the change, the magnitude of the fade margin for the system is found in an operational situation when the level of an incoming signal is known in a normal operational situation.

Thanks to the solution in accordance with the invention, on the one hand the cumbersome and costly operation relating to the use of a separate attenuator is avoided, and on the other hand the need for making the transmit power of the transmitter precisely adjustable in a very broad range, which will add to the cost of the transmitter, is eliminated.

LIST OF DRAWINGS

In the following, the invention and its preferred embodiments will be described in closer detail by way of example with reference to the accompanying drawings, wherein FIG. 1 shows a radio link system in accordance with the invention on a general level;

FIG. 2 shows those parts of a receiver and a control and measuring unit in the link terminal in accordance with the invention which are essential to the invention;

DETAILED DESCRIPTION OF THE INVENTION

Figure 3:
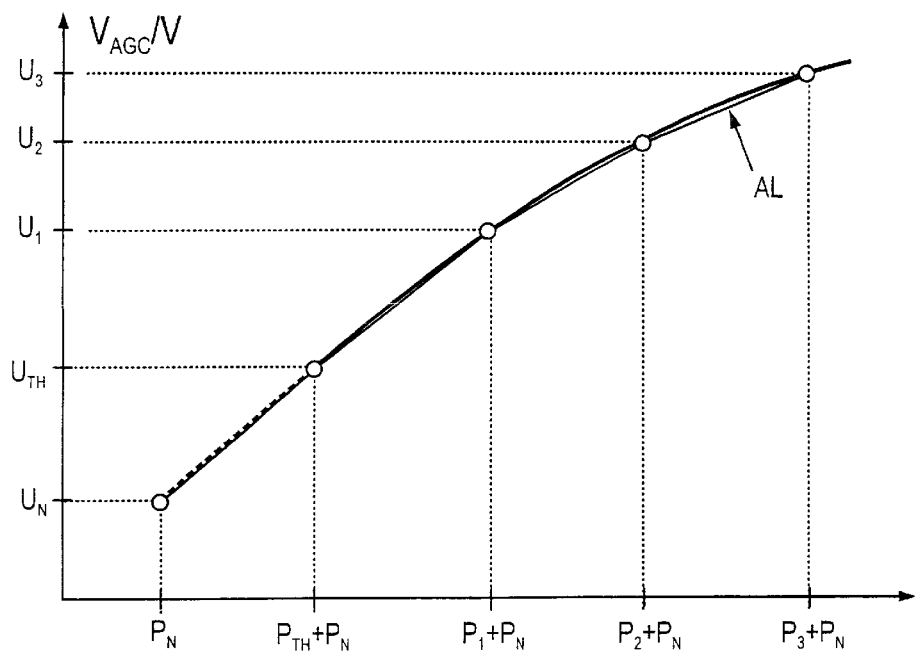
FIG. 3 illustrates calibration of the power measuring means of the receiver.

In the following, the invention will be described using as an example a radio link system constituting a bidirectional point-to-point connection. FIG. 1 illustrates a digital radio link system of this type on a general level. The system comprises two radio link terminals A and B, communicating with one another via a radio path RP. The figure uses like reference numerals for like parts, yet so that for radio link terminal A the reference numeral includes the letter a and for radio link terminal B the letter b. The transmitter (11a and 11b) and receiver (12a and 12b) of each link terminal are connected through a duplex filter or alternatively a switch (13a and 13b) to an antenna system (14a and 14b). Duplex filters are used when a bidirectional connection is desired, so that traffic passes simultaneously in both directions. The task of duplex filters is to separate the signals of the transmitter and receiver from each other. Duplex filters can be replaced with switches in a link system utilizing simplex communication.

Both link terminals further comprise a control and measuring unit (15a and 15b) for controlling the link terminals and for performing the measurements involved in the system. From the point of view of the invention, an essential factor is for example that the control and measuring unit can switch the transmitter off for measurements.

The invention is based on the insight that if the interference arriving at the receiver can be presumed to originate in sources sending a substantially continuous signal, such as other equivalent radio links (which is the typical situation particularly in radio link networks utilizing very high frequencies), the deterioration of sensitivity in the receiver can be estimated by measuring the signal level experienced by the receiver, affected by noise and interference, when the properties of the demodulator are known. On the basis of the deterioration of the sensitivity, the fade margin is found when the input level of the received signal is known in a normal operational situation of the radio link. On the basis of the properties of the demodulator, it can be estimated how interference signals modulated in a corresponding manner disturb the reception, and hence an estimate for the deterioration of the sensitivity is obtained.

A prerequisite for this procedure is, as will be described hereinafter, that the receiver of radio equipment, such as a link terminal, is capable of measuring noise and interference-like signals that are close to the noise level with adequate accuracy.

In the radio equipment in accordance with the invention, the measurement of the signal input level is based - similarly as in the prior art solutions in general—on an automatically adjusted amplifier or attenuator incorporated into the receiver, which standardizes the signal level arriving at the demodulator on the basis of the control information obtained from the demodulator. The received signal power can be calculated from the control signal of the amplifier (or attenuator) on the basis of individual calibration data.

FIG. 2 illustrates measuring means incorporated into the receiver of the link terminal, which are essential to the invention. The signal received at antenna ANT is supplied via an input amplifier stage 21 to a mixer 22 in which the signal is translated in a known manner by means of the signal of a local oscillator LO onto a lower frequency. After filtration in a filtering stage 23, the signal is supplied to the above automatically adjusted amplifier 24 whose output is connected to a demodulator 25. The control voltage $V_{AGC}$ of control loop CL constitutes said control signal by means of which the signal level is maintained substantially constant at the output of amplifier 24.

The output signal of the amplifier is supplied to the demodulator 25 wherefrom the demodulated signal S is supplied to an integrator 26. The reference voltage of the integrator is denoted by symbol REF. The output voltage of the integrator changes in different directions depending on whether the voltage arriving at the integrator is above or below said reference voltage. A control voltage $V_{AGC}$ is obtained from the integrator; this voltage is supplied via an A/D converter 27 to a microprocessor 29 which incorporates a memory 28.

In the prior art solutions, the receiver input signal power measurement is only operative in the range between the lowest and highest useful signal level. In the radio equipment in accordance with the invention, said control range of the amplifier (or attenuator) of the receiver shall nevertheless be broader than usual, as individual calibration shall be carried out at the receiver on the noise level as well. However, these changes can be made at very low additional cost. In addition, it is required that either the radio equipment or accessory equipment to be coupled thereto has the control and computation logic required to carry out the measurement. In the present example, this logic is provided in the microprocessor 29.

The method in accordance with the invention comprises the following steps. All steps set forth are not indispensable; the optional steps are indicated after the corresponding number.

1. During the development phase of radio equipment, e.g. a receiver of a link terminal, a function or table illustrating the change of the threshold power $P_{TH}$ as a function of noise power and interference power is experimentally determined therefor. In the simplest case, the interference can be presumed to be noise-like, in which case the noise and interference powers can be directly added together. Hence, the function has the form $P_{TH}=P_N+P_i+X$ [dB] where $P_N$ is the noise power, $P_i$ the interference power and X the signal-to-noise ratio that the receiver typically requires in order to reach the error ratio threshold.

2. During the manufacturing phase and/or later servicing of the receiver of the radio equipment, the input signal power measuring circuits of the receiver are calibrated individually to eliminate errors in measurement. This is effected by supplying to the receiver (FIG. 2) an input signal at a few different power levels and by measuring the output signal value of the integrator corresponding to each supply level. As stated previously, at least one of the supplied powers must be very small, substantially close to the noise level.

FIG. 3 illustrates the variation curve obtained by calibration. The horizontal axis depicts the power supplied to the receiver and the vertical axis the control voltage $V_{AGC}$ of the amplifier (24). The figure shows a total of five calibration points, and reference $P_N$ denotes the thermal noise power of the receiver, which is the sum of the antenna noise power and the internal thermal noise power of the receiver. Thus, all powers are depicted as powers acting on the antenna coupler, even though they were generated only later in the receiver chain.

The calibration in accordance with step 2 is performed in a known manner, except that it is carried out in a broader power range than usual. Normally only the range denoted by a continuous curve (thick line) in FIG. 3, i.e. supply powers in excess of the threshold power $P_{TH}+P_N$, are measured, but in the calibration step in accordance with the invention at least one calibration point is sought at a very low power level of the input signal as well. This should preferably be effected by cutting off the signal entirely, in which situation the receiver will only measure its own noise level which is previously known with fair accuracy, for example on the basis of the noise figure measured in the production stage of the receiver. (The noise figure indicates the magnitude of the noise per unit of bandwidth, and thus the bandwidth of the receiver will give the noise level.)

Hence, for instance the correspondence between the control voltage $V_{AGC}$ and the actual receiver input level is obtained in step 2 by linear piecewise approximation. This calibration curve is denoted by reference AL, and as was stated previously, it is broader than before, extending to the proximity of the noise power.

The microprocessor 29 stores the calibration values in the memory (28), and thus it can henceforth determine the input signal power level on the basis of the control voltage $V_{AGC}$. In other words, henceforth the measured input level (corresponding to the actual input level with the accuracy of the approximation used) is obtained from the microprocessor.

Figure 4:
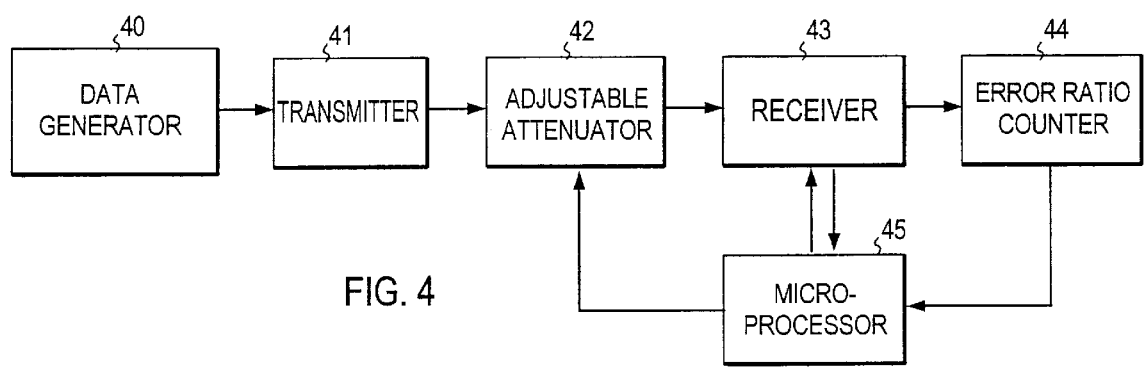
FIG. 4 shows a possible measurement arrangement to determine the error ratio threshold of the receiver.

3. During the manufacturing phase and/or later servicing of the radio equipment, the measurement result for its input level, corresponding to the error ratio threshold of its receiver (i.e. the threshold power value), is stored in the electronic memory (memory 28) incorporated into the radio equipment. This threshold power is thus the input signal power level wherewith the highest acceptable error ratio is obtained before the connection is deemed as cut off. FIG. 4 illustrates such a measurement. Generator 40 generating a pseudo-random bit sequence supplies a transmitter 41 whose output signal is connected via an adjustable attenuator 42 to a receiver 43. An error ratio counter 44 coupled to the receiver counts the bit error ratio, whose value it supplies to a microprocessor 45. On the basis thereof the microprocessor adjusts the attenuation of attenuator 42.

By adjusting the attenuator 42, a power value precisely corresponding to the error ratio threshold can be found, or alternatively the attenuation can be given a few values that are close to the desired error ratio threshold, and the power level corresponding to the error ratio threshold can be computationally determined on the basis of these values. The first method is more accurate but slower to perform.

One of the power levels supplied in the calibration step (step 2) is preferably a power corresponding to the error ratio threshold of the receiver ($P_{TH}+P_N$) as closely as possible, as it is also used in step 3, and hence the interpolation error will be minimal at this point of the calibration curve.

Prior to the commissioning of the radio system (for example a radio link), the memory (28) of the radio equipment typically contains calibration data and a measurement result for the input level corresponding to the error ratio threshold (denoted by reference $P_{Th1}$ in FIG. 2). The calibration data contains an input level measurement result corresponding to the thermal noise level.

4. When the radio system is installed and in operation, the actual fade margin measurement is started by suitable control. The command initiating the measurement is typically sent from an external system, such as a network management system.

5. Thereafter, the control and measuring unit disconnects the transmit power at both ends of the radio link for a given time. The measurement should preferably be carried out at both ends of the radio link, as the effect of interference is different if only by reason of receiver antennas physically located at different sites. Since bits have usually been reserved from a transmission frame on a radio link, for example, for establishing a control channel between the link terminals, the command can be transmitted to one link terminal which transmits it further via the link control channel to the other link terminal at the opposite end of the hop.

6. If the measurement is carried out at both ends, the receiver at each end measures the power of its input signal, consisting of thermal noise and possible interference (as the transmit power has been cut off).

7. From the difference of the input signal measurement result and the calibrated noise power value obtained in step 2 it is deduced how much the error ratio threshold has deteriorated. This is achieved by means of the correspondence established in step 1. When the change in the error ratio threshold is known, it is known that the error ratio threshold in the operational situation exceeds the error ratio threshold $P_{TH1}$ obtained in step 3 by the magnitude of said change. Therefore, the new threshold power corresponding to the operational situation, denoted by reference $P_{THNDET}$, is known at this stage.

8. (optional step) Step 6 can be repeated on the channels located on both sides of the reception channel used, to find out whether there is a danger of crosstalk from the neighbouring channels onto the channel on which the measurement is being carried out. In this way, the user can know whether the interference originates in the actual measured channel or in neighbouring channels. The effect of the neighbouring channels on the error ratio threshold can be calculated if it can be presumed that there is a similar transmission on the neighbouring channels as on the channel on which the measurement is being carried out In such a case, it is known on the basis of the specifications of the receiver how much less the interference on the neighbouring channel affects the desired channel than the interference on the desired channel does. It is to be noted that this step offers the user only additional information besides the actual fade margin measurement.

9. Thereafter, the transmit powers are again switched on. When the transmit powers are switched on, the input level of the desired signal is measured (if this measurement was not performed already before the power cutoff). The value of the error ratio threshold ($P_{THNDET}$) estimated in step 7 is subtracted from the measured level, which will give the fade margin as a result.

Since the noise and interference powers, which are summed into the payload signal, are negligible in relation to the actual payload signal power, it is not necessary to subtract the interference and noise powers—which are known on the basis of the previous measurements—from the measured power of the desired signal. Even though the interference and noise powers are not subtracted, in practice the measurement is sufficiently accurate in all circumstances.

In addition to the demodulator for the actual input level, the receiver can incorporate a comparator which compares the amplitude of the signal already averaged and standardized at this point to a limit value that is exceeded very seldom (or never) when only noise and continuous interference are received. If this comparator detects recurrent amplitude overshoots, the user can be warned of pulse-shaped interference. In such a situation, it is known that the fade margin measurement will yield unreliable results. This preferred embodiment will be described in the following with reference to FIGS. 5 . . . 7.

Figure 5:
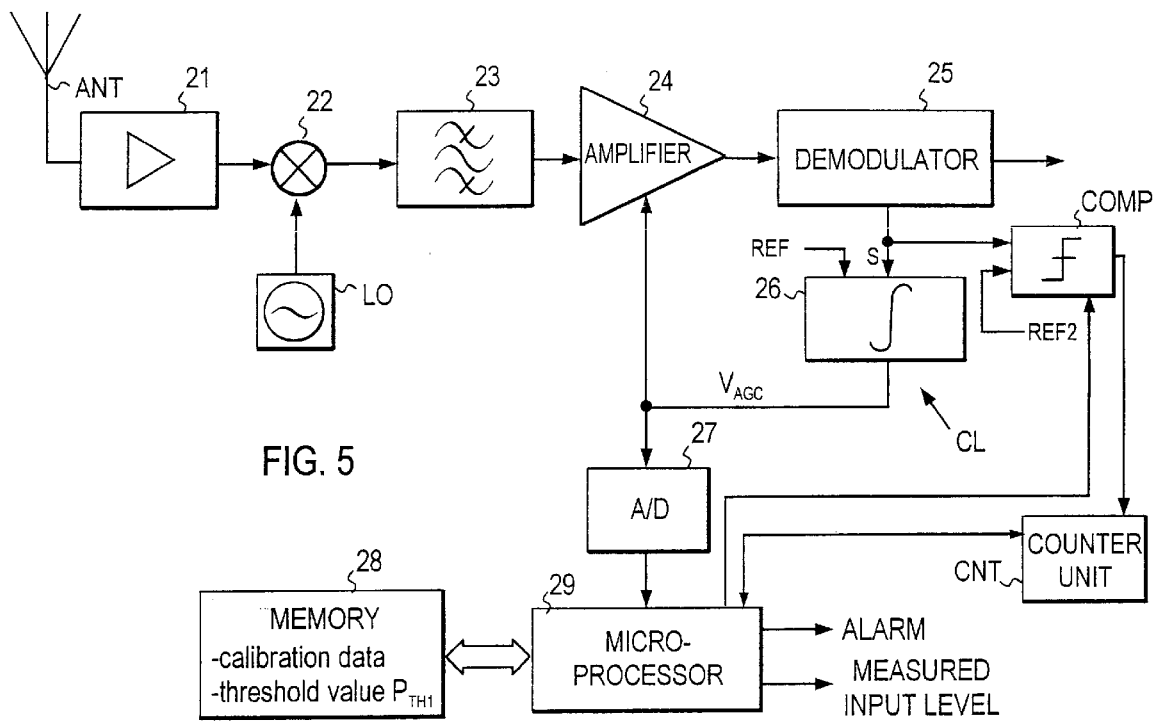
FIG. 5 illustrates a preferred implementation of a receiver in the link terminal in accordance with the invention.

FIG. 5 illustrates equipment corresponding to FIG. 2, to which the above-stated comparator (COMP) has been added by connecting the output signal S of the demodulator to the first input of the comparator. A reference voltage, denoted by reference REF2, is connected to the second input of the comparator. This reference voltage constitutes the above limit value. The output of the comparator is connected to a counter unit CNT, which counts overshoots of the reference value. The microprocessor 29 reads the counting result from the counter unit at given intervals.

Figure 6:
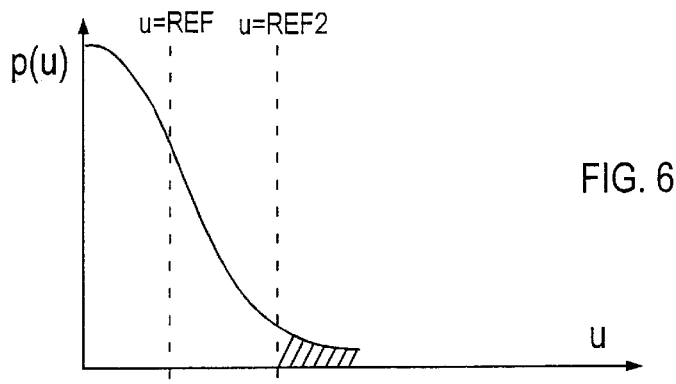
FIG. 6 illustrates the amplitude distribution of the demodulated signal at the sampling moment when the received signal comprises mere noise.
Figure 7:
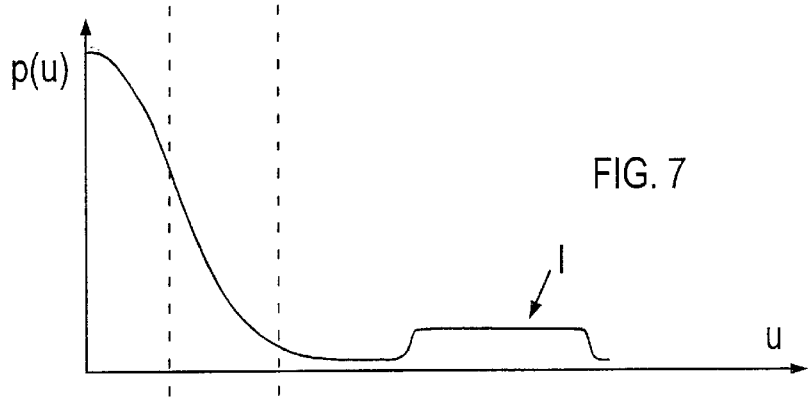
FIG. 7 illustrates the amplitude distribution of the demodulated signal at the sampling moment when the received signal contains pulse-shaped interference in addition to noise.

FIGS. 6 and 7 illustrate the probability density function p(u) of the amplitude u of the signal S arriving at the integrator 26 (that is, obtained from the demodulator). The horizontal axis illustrates the signal amplitude at the time of sampling.

FIG. 6 illustrates a situation where only noise is received. In such a case, the amplitude distribution makes a Gaussian distribution.

FIG. 7 illustrates a situation where pulse-shaped interference is also summed into the noise. For clarity, it has been presumed in the figure that the interference has a fairly high amplitude in order for the part caused by the interference, denoted by 1, to be discernible in the figure.

The reference voltage REF of the integrator 26 is set in such a way that the probability $P\{u<REF\}=P\{u>REF\}=½$. As will be seen from FIG. 6, the probability $P\{u>REF2\}$ (hatched area) is very small when there is no pulse-shaped interference. On the other hand, the corresponding probability is much higher when pulse-shaped interference is present, as will be seen from FIG. 7. As stated previously, for example the microprocessor 29 can monitor how often the reference level is exceeded and give an alarm if overshoots occur too often.

The value of the reference level (REF2) can be altered by software for example with the microprocessor 29, and thus a curve in accordance with FIG. 7 can be established by means of measurements. With each reference voltage value, the incidence of overshoots is measured. In other words, it is determined from the measurement how much of the time the signal is on the right side of each reference voltage. The amplitude comparison carried out by the comparator COMP can also be implemented on several different reference levels, and thus the amplitude distribution and hence the character and strength of the interference can be defined more closely on the basis of the number of samples exceeding the reference level. Such a measurement can be carried out, for example, only in a serious disturbance or failure situation, and the measurement can be performed either when the payload signal is on or when the payload signal is cut off.

The operations described above can be performed fully automatically in such a way that after the measurement initiation command (step 4), the computer prints out a measurement report that indicates the magnitude of the fade margin.

The method in accordance with the invention is operative when it can be presumed that interference is present substantially continuously and is not chopped by a very low pulse ratio (e.g. pulse-modulated radar), for instance. This is in fact the situation, especially when one operates at very high frequencies, since at such frequencies there are in practice no (old-fashioned) pulse-modulated radars that could cause interference. In the preferred embodiment of the invention described above, which includes a comparator detecting pulse interference (FIG. 5), the effect of pulses can be eliminated to some extent, or at least the user can be warned of the fact that pulse-shaped interference confuses the measurement Even though the method in accordance with the invention does not afford as good measurement accuracy as measurement with an accurate external attenuator, yet in practice the accuracy obtained is fully sufficient If the antenna system employed is such as to cause distortion of the payload signal, it changes the threshold values and causes a measurement error. In simple modulation methods, however, the effect is negligible.

Even though the invention has been explained in the foregoing with reference to examples in accordance with the accompanying drawings, it is obvious that the invention is not restricted to them but can be modified within the scope of the inventive idea disclosed in the appended claims. The system need not necessarily be a conventional bidirectional point-to-point connection, but the same principle can be applied for example to unidirectional radio connections and/or multipoint connections. In its minimum, the system thus comprises one transmitter and one receiver (simplex point-to-point connection). Moreover, for example the calculation and control pertaining to the measurements can be performed, except in a microprocessor incorporated into the radio equipment, also in a computer attached to the radio equipment or in a computer of a network management system. The calculation and control can also be handled in such a way that they are distributed between means incorporated into or attached to the radio equipment and an external system, such as a network management system. Also the implementation of the input level measurement and of the calibration can vary in many ways. The computational formulae used can also vary according to how accurately it is desired to take into account the properties of the system. The measurement of the receiver input level can be based on averaging the amplitude or power or on peak value measurement. Also, the numbering of the steps presented above does not necessarily correspond to the sequence of the steps, but the relative order of the steps can be changed from that presented above.

What is claimed is:

1. A method for measuring the fade margin in a radio system comprising at least one transmitter (11*a*; 11*b*) and at least one receiver (12*b*; 12*a*) which in an operational situation establish a fixed radio connection between them, in accordance with which method the receiver is calibrated by supplying the receiver with an input signal at several different power levels and determining the relationship between the supplied signal level and a quantity detected by the receiver, characterized in that (a) the calibration is carried out in such a way that at least one supplied power level is close to the noise level of the receiver, (b) in a situation where substantially mere noise is summed into the payload signal, a threshold value ($P_{TH1}$) for the received signal level, corresponding to a predetermined bit error ratio, is determined for the receiver, (c) in an operational situation of the radio system, the signal level arriving at the receiver is determined without payload signal, (d) on the basis of the calibration data and the level determined in step (c), that threshold value for the received signal level which corresponds to said predetermined bit error ratio in the operational situation of the radio system is determined, and (e) the fade margin is determined on the basis of the threshold value for the operational situation and the signal level measured in the operational situation of the radio system.

2. A method as claimed in claim 1, characterized in that the received signal level is continuously compared to a predetermined reference value (REF2), on the basis of the comparison, it is determined how frequently the signal level exceeds the reference value, and in the event of overshoots occurring more frequently than a predetermined value, an alarm of pulse-shaped interference is given.

3. A method as claimed in claim 1, characterized in that in a radio system in which both ends of the radio connection have receivers, the receiver is calibrated and steps (a)–(e) are performed at the receiver of each end of the radio connection.

4. A method as claimed in claim 1, characterized in that step (c) is performed, in addition to the actual measurement channel, also on at least one neighbouring channel.

5. A method as claimed in claim 1, characterized in that steps (a) and (b) are performed prior to the commissioning of the radio system.

6. A radio system comprising at least two pieces of radio equipment (A, B) together comprising at least one transmitter (11*a*; 11*b*) and at least one receiver (12*a*; 12*b*), said radio equipment in an operational situation establishing a fixed radio connection between them, and measuring means (24–29) for measuring a signal level arriving at the receiver, characterized in that the measuring means are adapted to measure signal levels close to a noise level of the receiver, and that the system further comprises information ($P_{TH1}$) on what a threshold value for the received signal level corresponding to a predetermined bit error ratio is in a situation where a payload signal and noise summed into it are received, switch means (15*a*, 15*b*) for temporarily switching off the transmitter of the radio equipment, and determination means (29) adapted to determine (a) on the basis of said information and measurements carried out with the measuring means, that threshold value for received signal level which corresponds to said predetermined bit error ratio in the operational situation of the radio system, and (b) on the basis of the threshold value for the operational situation and the signal level measured in the operational situation, the fade margin of the radio system.

7. A radio system as claimed in claim 6, characterized in that the determination means (29) are incorporated into the radio equipment (A, B).

8. A radio system as claimed in claim 6, characterized in that it further comprises comparator means (COMP) for comparing the received signal level to a predetermined reference value (REF2), and alarm means (29) responsive to said comparator means for giving an alarm if the received signal level exceeds the reference level more frequently than a predetermined value.

* * * * *